United States Patent
Oohata et al.

(10) Patent No.: US 8,441,719 B2
(45) Date of Patent: May 14, 2013

(54) PHOTON PAIR GENERATING APPARATUS AND PHOTON PAIR GENERATING METHOD

(75) Inventors: Goro Oohata, Sakai (JP); Hisaki Oka, Sakai (JP); Hajime Ishihara, Sakai (JP)

(73) Assignee: Osaka Prefecture University Public Corporation, Osaka (JP)

( * ) Notice: Subject to any disclaimer, the term of this patent is extended or adjusted under 35 U.S.C. 154(b) by 293 days.

(21) Appl. No.: 12/989,888

(22) PCT Filed: Apr. 28, 2009

(86) PCT No.: PCT/JP2009/058333
§ 371 (c)(1),
(2), (4) Date: Oct. 27, 2010

(87) PCT Pub. No.: WO2009/133877
PCT Pub. Date: Nov. 5, 2009

(65) Prior Publication Data
US 2011/0038033 A1 Feb. 17, 2011

(30) Foreign Application Priority Data
May 1, 2008 (JP) .................... 2008-119854

(51) Int. Cl.
*G02F 1/35* (2006.01)
*H01S 3/10* (2006.01)
(52) U.S. Cl.
USPC ............. 359/326; 359/330; 372/21; 372/22; 250/503.1
(58) Field of Classification Search .............. None
See application file for complete search history.

(56) References Cited

U.S. PATENT DOCUMENTS

| 2002/0030186 | A1 | 3/2002 | Tomita |
| 2007/0216991 | A1 | 9/2007 | Edamatsu et al. |
| 2009/0016386 | A1* | 1/2009 | Edamatsu et al. ............ 372/21 |
| 2009/0045355 | A1* | 2/2009 | Desbrandes ............... 250/503.1 |
| 2009/0114925 | A1 | 5/2009 | Ajiki et al. |
| 2012/0051740 | A1* | 3/2012 | Arahira ....................... 398/28 |

FOREIGN PATENT DOCUMENTS

| JP | 2002-040505 A | 2/2002 |
| JP | 2005-309012 A | 11/2005 |
| JP | 2007-219314 A | 8/2007 |
| WO | 2007-094094 A1 | 8/2007 |

OTHER PUBLICATIONS

International Search Report for PCT/JP2009/058333, mailed Jun. 2, 2009.
Ohata, Goro et al., "DBR-Gata CuCl Micro Cavity ni Okeru Rabi-bunretsu no Seigyo", Abstracts of the Meeting of the Physical Society of Japan, vol. 63, No. 1, separate vol. 4, (Feb. 29, 2008), p. 704, 23 pYJ-2.

(Continued)

*Primary Examiner* — Hemang Sanghavi
(74) *Attorney, Agent, or Firm* — Nixon & Vanderhye PC

(57) ABSTRACT

In a photon pair generating apparatus for generating a pair of correlated photons by hyper-parametric scattering, a light-shaping section irradiates an optical resonator with two beams of light of equal wavelength from different directions, and the optical resonator is configured to emit two correlated photons of different wavelengths in one direction as a pair of correlated photons. This makes it possible to provide a photon pair generating apparatus capable of achieving generation of a pair of correlated photons by a simpler configuration.

10 Claims, 7 Drawing Sheets

OTHER PUBLICATIONS

Young, R.J. et al., "Entangled Photons from the Biexciton Cascade of Quantum Dots", Journal of Applied Physics, vol. 101, (Apr. 15, 2007), pp. 081711-1 to 081711-4.

International Search Report for PCT/JP2009/058333, from the Japanese Patent Office, mailed Jun. 2, 2009.

"Generation of ultraviolet entangled photons in a semiconductor"; K. Edamatsu et al., Nature vol. 431, Sep. 9, 2004, pp. 167-170.

"Entangled-Photon Generation in Biexcitonic Cavity QED"; H. Ajiki et al., Journal of the Physical Society of Japan, vol. 76, No. 5, May 2007, pp. 053401-1-053401-4.

"Control of Rabi-splitting in CuCl microcavities with distributed Bragg reflector"; Goro Oohata et al., Proceedings of the Physical Society of Japan, Feb. 29, 2008, vol. 63, No. 1, separate vol. 4, p. 704, 23pYJ-2.

"Entangled photons from the biexciton cascade of quantum dots"; R.J. Young et al., Journal of Applied Physics, 101, pp. 081711-1-081711-4.

Japanese Application No. 2010-510130; National Phase in Japan of the PCT International Patent Application No. PCT/JP2009/058333. The Japanese Notice of Allowance is attached hereto, Mailing Date is Feb. 26, 2013—Applicant does not wish to submit an English Translation of the Notice of Allowance.

M. Nakayama et al. Observation of Biexciton-Resonant Hyper-Parametric Scattering in $SiO_2$/CuCl Layered Structures Japanese Journal of Applied Physics, 2007, vol. 46, No. 10, pp. L234-L-236.

* cited by examiner

PHOTON PAIR GENERATING APPARATUS AND PHOTON PAIR GENERATING METHOD

This application is the U.S. national phase of International Application No. PCT/JP2009/058333 filed 28 Apr. 2009, which designated the U.S. and claims priority to JP Application No. 2008-119854 filed 1 May 2008, the entire contents of each of which are hereby incorporated by reference.

TECHNICAL FIELD

The present invention relates to a photon pair generating apparatus for generating a pair of quantum-correlated photons.

BACKGROUND ART

In 1984, Charles Bennet et al. devised a quantum cryptographic protocol and the like. The quantum cryptography has triggered vigorous studies intended to achieve quantum cryptographic communications. In particular, the generation of a pair of quantum-correlated photons (i.e., a pair of quantum-entangled photons) is essential to a cryptographic protocol based on the nonlocal correlation between paired photons and a quantum transponder based on the principle of quantum teleportation, and therefore plays a very important role as an elemental technology for optical quantum cryptographic communications.

Thanks to the development of a method based on parametric downward conversion, it has become possible to generate a pair of quantum-correlated photons with some degree of efficiency. This method includes irradiating a nonlinear optical crystal with a high-power laser beam and obtaining a pair of photons through a secondary nonlinear optical process. This method has been used to date to conduct application experiments. However, this method presents such drawbacks as follows: (i) it is not efficient in generation; causes a difficulty in generating a pair of short-wavelength photons; and (iii) it causes a difficulty in generating multiphotons. Therefore, there has been a need for a new method for generation using a semiconductor or the like.

In 2004, under such circumstances, Keiichi Edamatsu et al. achieved the generation of a pair of short-wavelength correlated photons through a resonant hyper-parametric scattering process in a semiconductor CuCl bulk crystal (see Non-patent Literature 1 and Patent Literature 1). Further, Hiroshi Ajiki et al. proposed a structure in which a resonator has a semiconductor nanocrystal embedded therein, and were able to increase the efficiency of generation of a pair of photons several digits by using the structure (see Non-patent Literature 2 and Patent Literature 2).

As compared with the conventional method based on parametric downward conversion, the generation of a pair of correlated photons through resonant hyper-parametric scattering in a semiconductor bulk crystal allows high-efficiency generation by using the resonance levels of electrons, and its greatest feature and merit lie in the fact that a pair of short-wavelength correlated photons is obtained. Ajiki et al. proposed generating a pair of correlated photons more highly efficiently by using a semiconductor nanocrystal, which is more desirable in terms of being made into a device, while keeping such an advantage.

According to this proposal, a pair of correlated photons is taken out by a method for active use of a resonator polariton state (mixed state of an exciton and a resonator photon) that is formed in a resonator. First, two types of excitation light are allowed to be concentrically incident upon a sample perpendicularly. The wavelength of one of the excitation beams is adjusted to be a wavelength corresponding to that of the lower branch of a resonator polariton, and the wavelength of the other beam is adjusted to be another wavelength that is determined by a parameter of the sample. Thus, the dual-wavelength light is used as energy for generating a dual-particle excited state. Paired photons thus generated are emitted at their respective predetermined angles of emission in such directions as to be symmetrical about a direction normal to a surface of emission. The paired photons thus emitted are detected by detectors provided in positions corresponding to the respective angles of emission.

CITATION LIST

Patent Literatures
Patent Literature 1
  Japanese Patent Application Publication, Tokukai, No. 2005-309012 (Publication Date: Nov. 4, 2005)
Patent Literature 2
  Japanese Patent Application Publication, Tokukai, No. 2007-219314 (Publication Date: Aug. 30, 2007)
Non-Patent Literatures
  Non-patent Literature 1
  K. Edamatsu, G. Oohata, R. Shimizu, and T. Itoh, *Nature*, 431, 167 (2004).
  Non-patent Literature 2
  H. Ajiki and H. Ishihara, *J. Phys. Soc. Jpn.* 76, 053401 (2007).

SUMMARY OF INVENTION

Technical Problem

In the conventional configuration above, an optical resonator is irradiated with two beams of excitation light of different wavelengths. Therefore, it has been necessary to provide two types of light source for emitting beams of light of different wavelengths. Such provision of two different types of light source leads to an increase in cost and an increase in size of the apparatus due to an increase in number of components, and it has been comparatively difficult to control the wavelengths of two beams of light.

Further, two correlated photons that are emitted from the optical resonator travel in different directions. Therefore, it has been necessary to dispose photon detectors in positions corresponding to the traveling directions for detecting the respective correlated photons, and it has been comparatively difficult to keep such position accuracy.

Further, in the conventional configuration above, two types of excitation light are made concentrically incident upon the optical resonator. In so doing, the wavelength of one of the types of excitation light is adjusted to be a wavelength corresponding to that of the lower branch of a resonator polariton, and the wavelength of the other type of excitation light is adjusted to be another wavelength that is determined by a parameter of the sample. In the case of such a configuration, principally, the angles of emission of the two correlated photons are comparatively small. For example, on the assumption of a half-wavelength resonator as proposed by Hiroshi Ajiki et al., the angles of emission are approximately 4.5 degrees each. In this case, even if two photon detectors are provided to independently detect the respective correlated photons, one of the detectors may detect that one of the correlated photons which it is not supposed to detect, for example. Therefore, it is comparatively difficult to accurately detect the two correlated photons separately from each other.

Further, although excitation light is partially converted into a correlated photon by the action of the optical resonator 5, it is mostly transmitted through the optical resonator 5 without change. In the conventional configuration, there is only a comparatively small difference between the traveling direction of excitation light and the traveling direction of a correlated photon. Therefore, it is also comparatively difficult to detect the excitation light and the correlated photon separately from each other.

Furthermore, in the case of the conventional configuration above, a photon of excitation light and a correlated photon are both in a state related to a lower-branch resonator polariton; therefore, there is only a comparatively small difference between the energy of the photon of excitation light and the energy of the correlated photon. For example, on the assumption of a half-wavelength resonator as proposed by Hiroshi Ajiki et al., the energy difference is approximately 4.5 meV (0.5 nm). In this case, it is difficult to surely separate a photon of excitation light and a correlated photon through a simple component such as a filter, and it is necessary to provide a huge apparatus such as a spectroscope.

The present invention has been made in view of the foregoing problems, and it is an object of the present invention to provide a photon pair generating apparatus for generating a pair of correlated photons through hyper-parametric scattering, wherein the generation of a pair of correlated photons is achieved by a simpler configuration.

Solution to Problem

In order to solve the foregoing problems, a photon pair generating apparatus according to the present invention includes: a light source for emitting light; a light-shaping section for shaping a beam of light emitted from the light source; a correlated-photon-pair generating member for taking in two photons from a beam of light emitted from the light-shaping section, for generating an excitonic molecule by resonantly exciting the two photons, and for, through collapse of the excitonic molecule, releasing two correlated photons quantum-correlated with each other as a pair of correlated photons, the light-shaping section irradiating the correlated-photon-pair generating member with two beams of light of equal wavelength from different directions, the correlated-photon-pair generating member being configured to emit two correlated photons of different wavelengths in one direction as the pair of correlated photons.

Further, a photon pair generating method according to the present invention is a method including the steps of: (i) using a light-shaping section to shape a beam of light emitted from a light source for emitting light; and (ii) using a correlated-photon-pair generating member to take in two photons from a beam of light emitted from the light-shaping section, to generate an excitonic molecule by resonantly exciting the two photons, and to, through collapse of the excitonic molecule, release two correlated photons quantum-correlated with each other as a pair of correlated photons, the light-shaping section irradiating the correlated-photon-pair generating member with two beams of light of equal wavelength from different directions, the correlated-photon-pair generating member being configured to emit two correlated photons of different wavelengths in one direction as the pair of correlated photons.

According to the foregoing configuration or method, two beams of excitation light with which the correlated-photon-pair generating member is irradiated are of the same wavelength. Therefore, as compared to the conventional configuration, which is irradiated with two beams of light of different wavelengths, the light source 4 can be configured more simply.

Further, although in the configuration it is necessary to irradiate the correlated-photon-pair generating member with two beams of excitation light from different directions, this can be achieved by a comparatively simple configuration, which will be described in detail later.

Further, two correlated photons that are emitted from the correlated-photon-pair generating member differ in wavelength from each other and travel in the same direction. This eliminates the need for such a hard-to-adjust configuration as to set the positions of light-detecting sections in accordance with the traveling directions of correlated photons as has been required conventionally, thereby allowing a simpler and easy-to-fabricate configuration. It should be noted that means for separating two correlated photons of different wavelengths from each other can be realized, for example, by a simple component such as a beam splitter or a wavelength-selecting filter.

Further, the photon pair generating apparatus thus configured according to the present invention may be configured to further include an optical resonator for taking in light emitted from the light source, and for increasing an intensity of the light by internally resonating the light, wherein the correlated-photon-pair generating member is located internally in the optical resonator.

In the foregoing configuration, the correlated-photon-pair generating member is located internally in the optical resonator. As described above, the correlated-photon-pair generating member is a member for generating a pair of correlated photons by resonant hyper-parametric scattering. It should be noted here that the optical resonator has a function of taking in light emitted from the light source, and of increasing an intensity of the light by internally resonating the light. Inclusion of the correlated-photon-pair generating member in the optical resonator having such a function makes it possible to cause photons with increased intensity to act on the correlated-photon-pair generating member. Therefore, the efficiency of generation of a pair of correlated photons can be better increased, as compared to the case where the correlated-photon-pair generating member is used alone.

Further, a photon pair generating apparatus includes: a light source for emitting light; a light-shaping section for shaping a beam of light emitted from the light source; an optical resonator for taking in light emitted from the light source, and for increasing an intensity of the light by internally resonating the light, the optical resonator including a correlated-photon-pair generating member for generating an excitonic molecule by resonantly exciting two photons taken therein, and for, through collapse of the excitonic molecule, releasing two correlated photons quantum-correlated with each other as a pair of correlated photons, the optical resonator being set so that a degree of detuning and a binding energy of the excitonic molecule are equal, the degree of detuning representing a difference between a resonance energy of an exciton and a resonance energy of a photon confined in the resonator, the light-shaping section irradiating the optical resonator with light so that phase matching conditions are satisfied between two photons incident upon the optical resonator and two correlated photons being emitted from the optical resonator.

Further, a photon pair generating method according to the present invention is a method including the steps of: (i) using a light-shaping section to shape a beam of light emitted from a light source for emitting light; and (ii) using an optical resonator to take in light emitted from the light source, and to increase an intensity of the light by internally resonating the light, the optical resonator including a correlated-photon-pair generating member for generating an excitonic molecule by resonantly exciting two photons taken therein, and for, through collapse of the excitonic molecule, releasing two correlated photons quantum-correlated with each other as a pair of correlated photons, the optical resonator being set so that a degree of detuning and a binding energy of the excitonic molecule are equal, the degree of detuning representing a difference between a resonance energy of an exciton and a resonance energy of a photon confined in the resonator, the light-shaping section irradiating the optical resonator with light so that phase matching conditions are satisfied between two photons incident upon the optical resonator and two correlated photons being emitted from the optical resonator.

According to foregoing configuration or method, the difference in angle between the traveling direction of excitation light and the traveling direction of a correlated photon can be made wider than ever before. This makes it possible to easily achieve separation between a photon of excitation light and a correlated photon and separation between two correlated photons.

Further, according to the foregoing configuration, the difference between the energy of a photon of excitation light and the energy of a correlated photon can be made comparatively great. This makes it possible to achieve separation between a photon of excitation light and a correlated photon through a simple component such as a wavelength-selecting filter without using a component such as a spectrometer.

Further, the photon pair generating apparatus thus configured according to the present invention may be configured such that: the light-shaping section irradiates the correlated-photon-pair generating member with two beams of light of equal wavelength from different directions; and the optical resonator is configured to emit two correlated photons of different wavelengths in one direction as the pair of correlated photons.

According to the foregoing configuration, two beams of excitation light with which the correlated-photon-pair generating member is irradiated are of the same wavelength. Therefore, as compared to the conventional configuration, which is irradiated with, two beams of light of different wavelengths, the light source 4 can be configured more simply.

Further, although in the configuration it is necessary to irradiate the correlated-photon-pair generating member with two beams of excitation light from different directions, this can be achieved by a comparatively simple configuration, which will be described in detail later.

Further, two correlated photons that are emitted from the correlated-photon-pair generating member differ in wavelength from each other and travel in the same direction. This eliminates the need for such a hard-to-adjust configuration as to set the positions of light-detecting sections in accordance with the traveling directions of correlated photons as has been required conventionally, thereby allowing a simpler and easy-to-fabricate configuration. It should be noted that means for separating two correlated photons of different wavelengths from each other can be realized, for example, by a simple component such as a beam splitter or a wavelength-selecting filter.

Further, the photon pair generating apparatus thus configured according to the present invention may be configured such that the optical resonator is configured so that an amount of Rabi splitting in the optical resonator is greater than a binding energy of the excitonic molecule.

According to the foregoing configuration, the amount of Rabi splitting, which indicates the strength of bond between an exciton and a photon contained in the optical resonator, is greater than the binding energy of the excitonic molecule; therefore, the efficiency of generation of a pair of correlated photon can be increased. In a region where the amount of Rabi splitting is less than the binding energy of the excitonic molecule, there is a sharp reduction in efficiency of generation. However, in a region where the amount of Rabi splitting is greater than the binding energy of the excitonic molecule, the efficiency is high, and a large angle of emission can be secured.

Further, the photon pair generating apparatus thus configured according to the present invention may be configured such that the correlated-photon-pair generating member is a quantum well, a quantum wire, or a quantum dot.

According to the foregoing configuration, the correlated-photon-pair generating member is constituted by a nanocrystal such as a quantum well, a quantum wire, or a quantum dot; therefore, the photon pair generating apparatus can be constituted by a nano-order fine configuration. Therefore, a high level of integration can be attained, for example, in the case of application to a quantum computer using a pair of correlated photons or the like.

Further, the photon pair generating apparatus thus configured according to the present invention may be configured such that: the light-shaping section includes an incident light-shaping lens and a mask; the incident light-shaping lens is irradiated with a beam of light emitted from the light source and having a predetermined light region; and the beam of light is split into two beams of light by placing the mask in the light region of the beam of light, so that the correlated-photon-pair generating member is irradiated with the two beams of light from different directions.

According to the foregoing configuration, by the lens and the mask, which are incredibly simple components, a configuration can be achieved in which one beam of light that is emitted from the light source is converted into two beams of light and the correlated-photon-pair generating member is irradiated with the two beams of light from different directions.

Further, the photon pair generating apparatus thus configured according to the present invention may be configured such that: the light-shaping section irradiates the correlated-photon-pair generating member with two beams of light of equal wavelength from different directions axisymmetrical about a direction normal to a light-incident surface of the correlated-photon-pair generating member; and the correlated-photon-pair generating member is configured to emit two correlated photons of different wavelengths as the pair of correlated photons in a direction normal to a light-emitting surface of the correlated-photon-pair generating member.

Advantageous Effects of Invention

As described above, a photon pair generating apparatus according to the present invention includes: a light source for emitting light; a light-shaping section for shaping a beam of light emitted from the light source; a correlated-photon-pair generating member for taking in two photons from a beam of light emitted from the light-shaping section, for generating an excitonic molecule by resonantly exciting the two photons, and for, through collapse of the excitonic molecule, releasing two correlated photons quantum-correlated with each other as a pair of correlated photons, the light-shaping section irradiating the correlated-photon-pair generating member with two beams of light of equal wavelength from different directions, the correlated-photon-pair generating member being configured to emit two correlated photons of different wavelengths in one direction as the pair of correlated photons. This brings about an effect of making it possible to configure the light source more simply as compared to the conventional configuration. Further, this eliminates the need for such a hard-to-adjust configuration as to set the positions of light-detecting sections in accordance with the traveling directions of correlated photons, thereby bringing about an effect of allowing a simpler and easy-to-fabricate configuration.

Further, a photon pair generating method according to the present invention is a method including the steps of: (i) using a light-shaping section to shape a beam of light emitted from a light source for emitting light; and (ii) using an optical resonator to take in light emitted from the light source, and to increase an intensity of the light by internally resonating the light, the optical resonator including a correlated-photon-pair generating member for generating an excitonic molecule by resonantly exciting two photons taken therein, and for, through collapse of the excitonic molecule, releasing two correlated photons quantum-correlated with each other as a pair of correlated photons, the optical resonator being set so that a degree of detuning and a binding energy of the excitonic molecule are equal, the degree of detuning representing a difference between a resonance energy of an excitors and a resonance energy of a photon confined in the resonator, the light-shaping section irradiating the optical resonator with light so that phase matching conditions are satisfied between two photons incident upon the optical resonator and two correlated photons being emitted from the optical resonator. This brings about an effect of making it possible to easily achieve separation between a photon of excitation light and a correlated photon and separation between two correlated photons. Further, this brings about an effect of making it possible to achieve separation between a photon of excitation light and a correlated photon through a simple component such as a wavelength-selecting filter without using a component such as a spectrometer.

BRIEF DESCRIPTION OF DRAWINGS

FIG. 1 schematically shows a configuration of an optical resonator of a photon pair generating apparatus according to an embodiment of the present invention.

FIG. 2 is a block diagram schematically showing a configuration of a photon pair generating system according to the present embodiment.

FIG. 3 is a perspective view schematically showing an example configuration of an excitonic activation medium in the optical resonator.

FIG. 4 is a graph showing an example of a resonator polariton dispersion relation in the optical resonator.

FIG. 5 is a graph showing an example of a resonator polariton dispersion relation in the optical resonator.

FIG. 6 is a graph showing a result of calculation of generation efficiency of correlated photons according to the theory of resonator QED (quantum electrodynamics).

FIG. 7 shows specific examples of a configuration of a part in which beams of excitation light are made incident upon the optical resonator and of a configuration in which two correlated photons are separated from each other.

FIG. 8 shows other specific examples of a configuration of a part in which beams of excitation light are made incident upon the optical resonator and of a configuration in which two correlated photons are separated from each other.

FIG. 9 shows still another specific example of a configuration of a part in which beams of excitation light are made incident upon the optical resonator.

DESCRIPTION OF EMBODIMENTS

An embodiment of the present invention is described below with reference to the drawings.

(Configuration of a Photon Pair Generating System)

Figure 2:
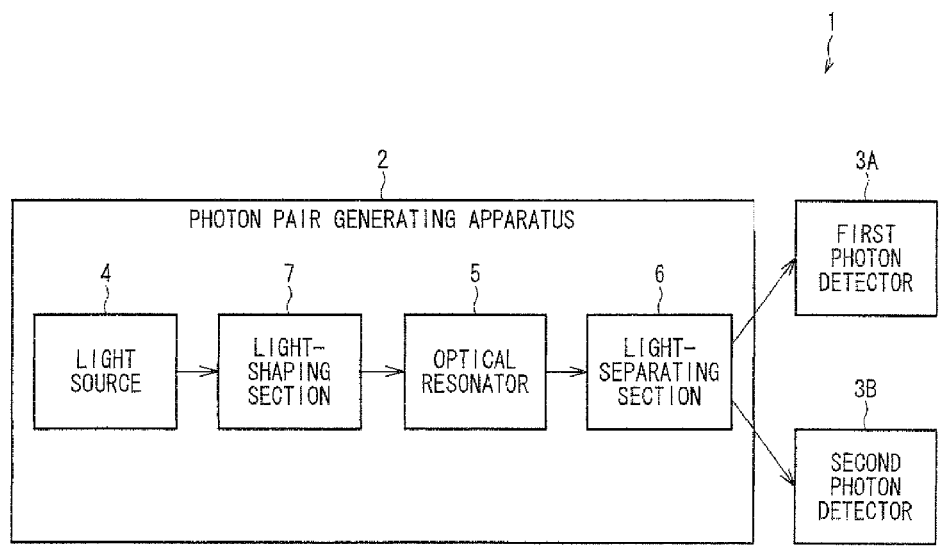
FIG. 2

FIG. 2 is a block diagram schematically showing a configuration of a photon pair generating system 1 according to the present embodiment. As shown in FIG. 2, the photon pair generating system 1 includes a photon pair generating apparatus 2, a first photon detector 3A, and a second photon detector 3B. The photon pair generating apparatus 2 is an apparatus that emits a pair of photons quantum-correlated with respect to polarization (pair of correlated photons). The first photon detector 3A is an apparatus that detects one of the two photons emitted from the photon pair generating apparatus 2, and the second photon detector 3B is an apparatus that detects the other one of the two photons emitted from the photon pair generating apparatus 2. In such a system, as soon as the quantum state of a photon that is detected by the first photon detector 3A is determined, a photon that is detected by the second photon detector 3B is determined to be in a one-to-one corresponding quantum state. The first and second photon detectors 3A and 3B, which are spatially separate from each other, share one-to-one corresponding information while keeping it confidential. This makes it possible to achieve quantum information communications.

The photon pair generating apparatus 2 includes a light source 4, an optical resonator 5, a light-separating section 6, and a light-shaping section 7.

The light source 4 includes a laser light source that produces light having properties required of excitation (incident) light, i.e., a predetermined wavelength, a predetermined pulse width, a predetermined cycle of repetition, and the like. Further, it is possible to use an optical component such as a nonlinear crystal to change light obtained from the light source into light having predetermined properties, Examples of the laser light source include a vertical-cavity surface-emitting laser (VCSEL).

The light-shaping section 7 serves to shape a beam of light emitted from the light source 4 so that the beam of light is incident upon the optical resonator 5. Specific example configurations of this light-shaping section 7 will be described later.

The optical resonator 5 internally resonates excitation light and, through the resonant hyper-parametric scattering process, emits a pair of photons quantum-correlated with respect to polarization (pair of correlated photons). A configuration of this optical resonator 5 will be described in detail later.

The light-separating section 6 is a component structured at least either so that paired photons emitted from the optical resonator 5 are separated from each other or so that a pair of photons emitted from the optical resonator 5 and a photon with which the light source 4 irradiates the optical resonator 5 are separated from each other. A configuration of this light-separating section 6 will be described in detail later.

Figure 1:
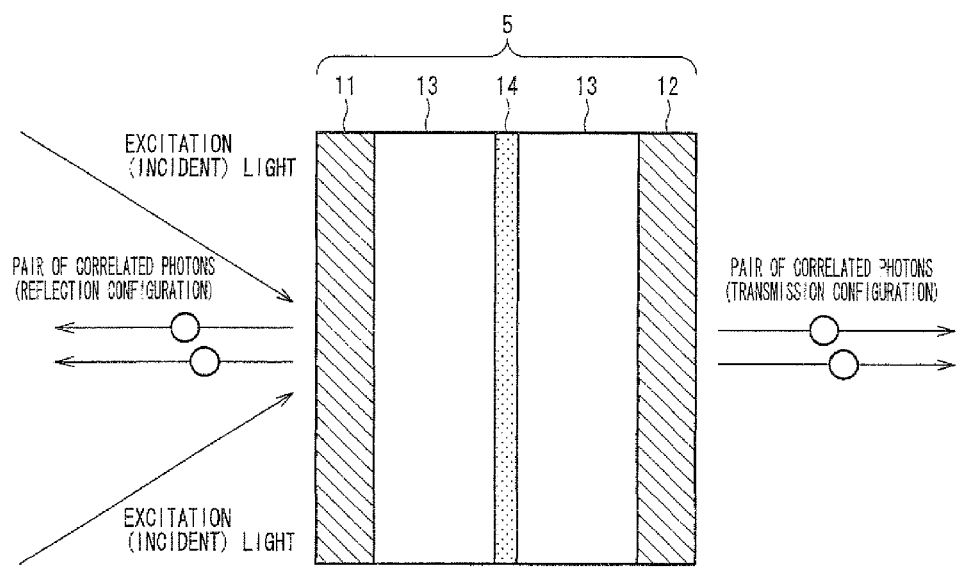
FIG. 1

FIG. 1 shows an example configuration of the optical resonator 5. As shown in FIG. 1, the optical resonator 5 includes first and second reflecting mirrors 11 and 12, a spacer layer 13, and an excitonic active medium (correlated-photon-pair generating member) 14.

The first and second reflecting mirrors 11 and 12 may each be a mirror of any material that allows the mirror to be used as part of an optical resonator to reflect light at an intended wavelength. For example, the first and second reflecting mirrors 11 and 12 can each, be a DBR (distributed Bragg reflector), i.e., a structure having transparent media of different refractive indices alternately stacked with a thickness of a quarter of the optical wavelength.

In a region between the first and second reflecting mirrors 11 and 12, the spacer layer 13 is provided to serve as a resonant space region. Moreover, the excitonic active medium 14 is provided inside of the spacer layer 13.

The excitonic active medium 14 is constituted by a thin film having a thickness on the order of nanometers (10 to 100 nm). In the present embodiment, the excitonic active medium 14 used is made of a CuCl crystal having a film thickness of 10 to 100 nm; however, the excitonic active medium 14 can be made of any material that allows generation of a pair of correlated photons through the resonant hyper-parametric scattering process.

Examples of the material for the excitonic active medium 14 other than the CuCl crystal include an inorganic-organic complex semiconductor. An inorganic-organic complex semiconductor has such a feature as to become very greater in binding energy between an exciton and an excitonic molecule. For example, the inorganic-organic complex semiconductor $(C_4H_9NH_3)_2PbBr_4$ has an excitonic molecule binding energy of 60 meV, which is greater than that of any existing inorganic semiconductor. Therefore, use of such an inorganic-organic complex semiconductor is expected to bring about an effect of increasing the degree of design freedom of the optical resonator 5 and enhancing a gain in signal.

Figure 3:
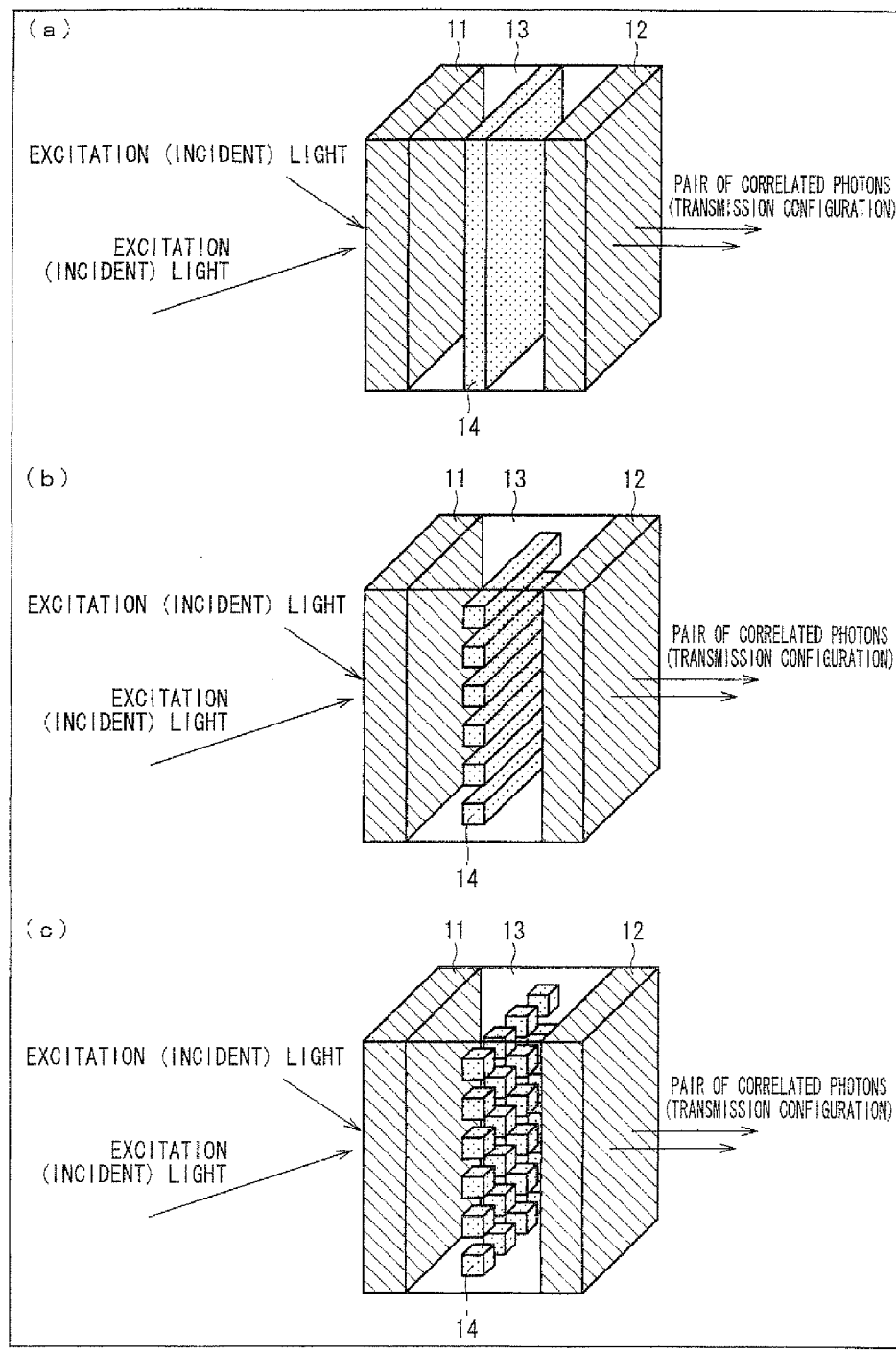
FIG. 3

In the example above, the excitonic active medium 14 takes, but is not limited to, the form of a thin film parallel to the surfaces of the first and second reflecting mirrors 11 and 12. (a) through (c) of FIG. 3 show example configurations of the excitonic active medium 14. (a) of FIG. 3 shows an example where the excitonic active medium 14 takes the form of a thin film. (b) of FIG. 3 shows an example where the excitonic active medium 14 is constituted by a plurality of fine wire structures. (c) of FIG. 3 shows an example where the excitonic active medium 14 is constituted by a plurality of dot structures.

In the configuration (b), the plurality of fine wire structures are placed at predetermined intervals from each other in a plane parallel to the surfaces of the first and second reflecting mirrors 11 and 12. These fine line structures are preferably, but are not limited to, quantum wires.

In the configuration (c), the plurality of dot structures are placed at predetermined intervals from each other as a matrix in a plane parallel to the surfaces of the first and second reflecting mirrors 11 and 12. These dot structures are preferably, but are not limited to, quantum dots.

Alternatively, although not shown, the excitonic active medium 14 may be configured such that a plurality of thin films parallel to the surfaces of the first and second reflecting mirrors 11 and 12 are placed side by side along a direction perpendicular to the surfaces of the thin films. Further, in cases where the excitonic active medium 14 is constituted by at least one thin film, this thin film is preferably, but is not limited to, a quantum well.

(Generation of a Pair of Correlated Photons)

As described above, irradiation of the excitonic active medium 14 with a laser beam having a specific wavelength causes resonant generation of an excitonic molecule through two-photon absorption. It should be noted that a state of an electron removed from a valence band by light can be thought of as a positively-charged particle (positive hole). The term "excitor" refers to a bound state of this positive hole and an electron excited in a conduction band. Further, the term "excitonic molecule" refers to a bound state of two excitons.

Moreover, two photons that are released in different directions in the process of disappearance of this excitonic molecule become quantum-correlated with respect to polarization. That is, a pair of correlated photons is thus generated. A pair of (quantum-)correlated photons is also called a pair of entangled photons, which refers to a pair of photons entangled with each other quantum-mechanically.

Such a scattering process (resonant hyper-parametric scattering process) can also be produced by irradiating the excitonic active medium 14 alone with light. However, in the case of the excitonic active medium 14 alone, there is a reduction in efficiency of generation of a pair of correlated photons due to a decrease in interaction with light.

Therefore, as described above, the photon pair generating apparatus 2 of the present embodiment is configured such that the optical resonator 5 has the excitonic active medium 14 provided inside thereof. By designing the excitonic active medium 14 and the optical resonator 5 under appropriate conditions (which will be described in detail later), the generation of a pair of correlated photons through the resonant hyper-parametric scattering process can be dramatically efficiently carried out, as compared to the configuration in which the excitonic active medium 14 is used alone.

Basically, the principle that use of the optical resonator 5 leads to an increase in efficiency of generation of a pair of correlated photons is based on the fact that the field intensity of an average of one photon in the optical resonator 5 becomes very high. More specifically, first, when light is incident upon the optical resonator 5, the light in the optical resonator 5 is put in a specific mode by a resonance, whereby the light increases in field intensity. It should be noted here that there are various modes of light in the optical resonator 5 and, depending on each mode, there is a place where the field intensity becomes high. By providing the excitonic active medium 14 in such a place where the field intensity becomes high, the efficiency of generation of a pair of correlated photons through the resonant hyper-parametric scattering process can be increased.

For example, in the case of a resonator mode smallest in frequency among the modes of light in the optical resonator 5 (resonator modes), the field intensity is highest near the center of the spacer layer 13. That is, by providing the excitonic active medium 14 near the center of the spacer layer 13, the efficiency of generation of a pair of correlated photons can be increased.

Correlated photons generated in the optical resonator 5 may be either emitted from a surface of the optical resonator 5 opposite the surface of incidence of excitation light (transmission configuration) or emitted from the same surface as the surface of incidence of excitation light (reflection configuration). The present embodiment is basically configured on the assumption of a transmission configuration, but may be configured to detect correlated photons emitted in a reflection configuration.

It should be noted that it is possible to generate a pair of correlated photons even in a configuration in which the excitonic active medium 14 is irradiated directly with excitation light without using the optical resonator 5. However, as compared to the case where the optical resonator 5 is used, there is a significant decrease in efficiency of generation of a pair of correlated photons. For example, on the condition that the excitonic active medium 14 has a constant thickness and is made of CuCl, the efficiency of generation with use of the optical resonator 5 is approximately $10^5$ times as high as the efficiency of generation with use of the optical resonator 5.

(Detailed Configuration of the Photon Pair Generating Apparatus)

Next, the details of a configuration of the photon pair generating apparatus 2 are explained. In the following, among the components of the photon pair generating apparatus 2, two types of design guideline on the design of excitation light with which the optical resonator 5 is irradiated and the design of a structure of the optical resonator 5 are explained.

(First Design Guideline)

In the conventional configuration, as described above, it has been necessary to provide two types of light source for emitting beams of light of different wavelengths. Therefore, there have been an increase in cost and an increase in size of the apparatus due to an increase in number of components, and it has been comparatively difficult to control the wavelengths of two beams of light.

Further, two correlated photons that are emitted from the optical resonator travel in different directions. Therefore, it has been necessary to dispose photon detectors in positions corresponding to the traveling directions for detecting the respective correlated photons, and it has been comparatively difficult to keep such position accuracy.

In the present embodiment, on the other hand, the optical resonator 5 is irradiated with two beams of excitation light of equal wavelengths from different directions. Further, the optical resonator 5 has its structure designed so that two correlated photons that are emitted travel in the same direction. In the following, this configuration is described in more detail.

First, the angle of incidence of excitation light with respect to the optical resonator 5 is explained. Two beams of excitation light are made incident upon the outer surface of the first reflecting mirror 11 in the optical resonator 5. In so doing, a first one of the beams of excitation light is incident at a predetermined angle with respect to a direction normal to a surface of the thin film constituted by the excitonic active medium 14 (excitonic active medium surface), and a second one of the beams of excitation light is incident at an angle axisymmetrical to the direction of incidence of the first beam of excitation light about the direction normal to the excitonic active medium surface. That is, the two beams of excitation light are incident upon the optical resonator 5 from directions symmetrical to each other about the direction normal to the excitonic active medium surface. It should be noted that because the excitonic active medium surface and the outer surface of the first reflecting mirror 11 are parallel to each other, the two beams of excitation light are incident on the optical resonator 5 from directions symmetrical to each other about the direction normal to the outer surface of the first reflecting mirror 11.

Figure 4:
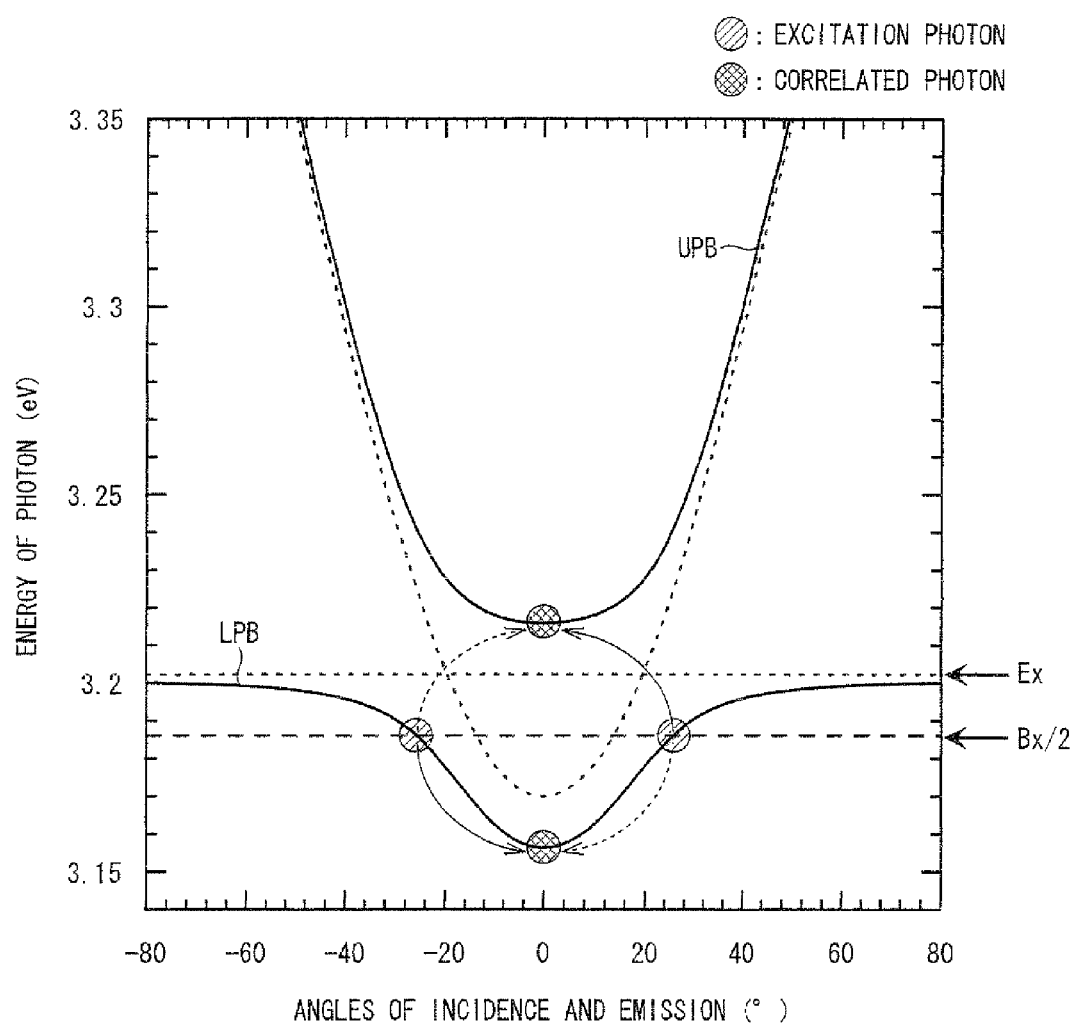
FIG. 4

Next, the design of the optical resonator 5 is explained. The optical resonator 5 is structured so that when two beams of excitation light are incident on the optical resonator 5 as described above, the optical resonator 5 internally generates a resonant hyper-parametric scattering process to emit two correlated photons of different wavelengths in the same direction. FIG. 4 is a graph showing a resonator polariton dispersion relation in the optical resonator 5 thus structured. In FIG. 4, the horizontal axis represents the angle of incidence of each photon of excitation light incident upon the optical resonator 5 or the angle of emission (°) of each correlated photon that is emitted from the optical resonator 5, and the vertical axis represents the energy (eV) of a corresponding polariton. Further, UPB represents an upper-branch resonator polariton, and LPB represents a lower-branch resonator polariton. Ex represents the energy of an exciton state, and Bx represents the energy of an excitonic molecule state.

When two photons of excitation light of a wavelength corresponding to Bx/2 are incident upon the optical resonator 5 thus designed at angles of incidence of ±26° respectively, they are first in a state of an excitonic molecule and then re-split into an upper-branch resonator polariton and a lower-branch resonator polariton. At this point, as shown in FIG. 4, the correlated photon in the upper-branch resonator polariton and the correlated photon in the lower-branch resonator polariton are different in photon energy from each other but are both emitted at an angle of emission of 0°. That is, the two correlated photons of different wavelengths are emitted in the same direction.

Examples of parameters for designing the optical resonator 5 as described above include: the material for the excitonic active medium 14; the material for the first and second reflecting mirrors 11 and 12; the thickness of the thin film constituting the excitonic active medium 14; the thickness of the optical resonator 5 (distance between the outer surface of the first reflecting mirror 11 and the outer surface of the second reflecting mirror 12); the material for the spacer layer 13; the position of the excitonic active medium 14 in the optical resonator 5; the number of layers in cases where the excitonic active medium 14 is a multilayer structure; the shape and size of the excitonic active medium 14 in cases where the excitonic active medium 14 is a structure other than a thin-film structure; etc. By designing these parameters appropriately and making excitation light incident at an angle suited to the design, two correlated photons of different wavelengths can be emitted in the same direction.

According to the foregoing configuration, the two beams of excitation light with which the optical resonator 5 is irradiated are of the same wavelength. Therefore, as compared to the conventional configuration, which is irradiated with two beams of light of different wavelengths, the light source 4 can be configured more simply. Although in the configuration it is necessary to irradiate the optical resonator 5 with two beams of excitation light from different directions, this can be achieved by a comparatively simple configuration. A specific example of such a configuration will be described later.

Further, two correlated photons that are emitted from the optical resonator 5 differ in wavelength from each other and travel in the same direction. Therefore, by first separating the correlated photons, which travel in the same direction, from each other through a beam splitter or the like and then extracting the required correlated photons through wavelength-selecting filters or the like, the two correlated photons can be detected, respectively. This eliminates the need for such a hard-to-adjust configuration as to set the positions of light-detecting sections in accordance with the traveling directions of correlated photons as has been required conventionally, thereby allowing a simpler and easy-to-fabricate configuration.

(Second Design Outline)

In the conventional configuration, as described above, two types of excitation light are made concentrically incident upon the optical resonator. In so doing, the wavelength of one of the types of excitation light is adjusted to be a wavelength corresponding to that of the lower branch of a resonator polariton, and the wavelength of the other type of excitation light is adjusted to be another wavelength that is determined by a parameter of the sample. In the case of such a configuration, principally, the angles of emission of the two correlated photons are comparatively small. In this case, even if two photon detectors are provided to independently detect the respective correlated photons, one of the detectors may detect that one of the correlated photons which it is not supposed to detect, for example. Therefore, it is comparatively difficult to accurately detect the two correlated photons separately from each other.

Further, in the conventional configuration, there is only a comparatively small difference between the traveling direction of excitation light and the traveling direction of a correlated photon. Therefore, it is also comparatively difficult to detect the excitation light and the correlated photons separately from each other.

Furthermore, in the case of the conventional configuration above, there is only a comparatively small difference between the energy of a photon of excitation light and the energy of a correlated photon. Therefore, it is difficult to surely separate the photon of excitation light and the correlated photon from each other through a simple component such as a filter, and it is necessary to provide a huge apparatus such as a spectroscope.

In the present embodiment, on the other hand, the optical resonator 5 is structured so that the degree of detuning and the binding energy of an excitonic molecule are equal, and excitation light is made incident upon the optical resonator 5 so that the phase matching conditions are satisfied. In the following, this configuration is described in more detail.

Figure 5:
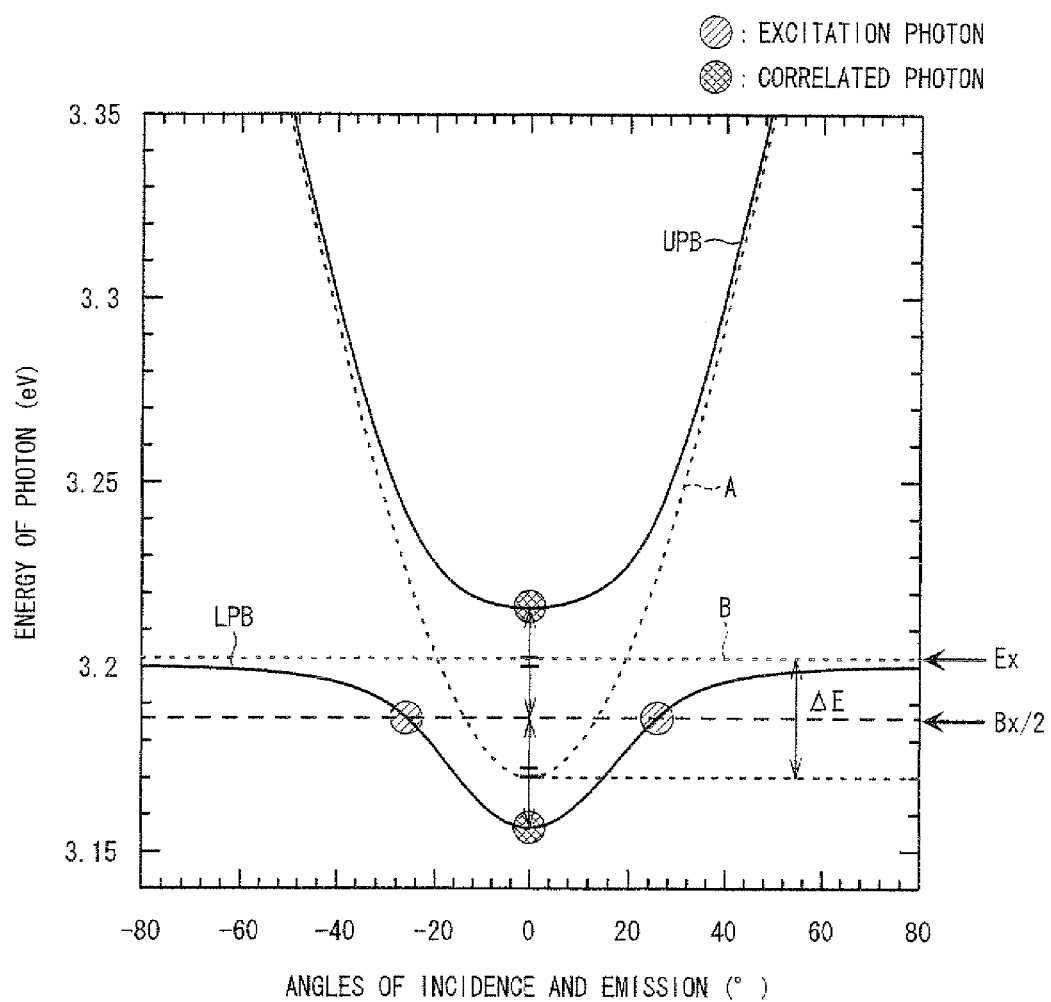
FIG. 5

FIG. 5 is a graph showing a resonator polariton dispersion relation in the optical resonator 5 configured so that the degree of detuning and the binding energy of an excitonic molecule are equal. FIG. 5 is basically the same graph as FIG. 4, and no explanation is given for what FIGS. 4 and 5 share in common.

The term "degree of detuning" here means a difference between the resonance energy of an exciton that is generated in the optical resonator 5 and the resonance energy of a photon confined in the optical resonator 5. In FIG. 5, A represents a dotted line that corresponds to the resonance energy of a photon confined in the optical resonator 5, and B represents a dotted line that corresponds to the resonance energy of an exciton. As shown in FIG. 5, the difference $\Delta E$ between the resonance energy of an exciton at an angle of incidence of 0° and the resonance energy of a material system corresponds to the degree of detuning. It should be noted here that the resonance energy of the exciton is lower than the resonance energy of the material system, and this indicates that the degree of detuning is negative.

Further, the binding energy of an excitonic molecule is expressed by a difference between energy twice as high as the energy Ex of an exciton state and the energy Bx of an excitonic molecule state. That is, in cases where the degree of detuning and the binding energy of the excitonic molecule are equal, the following relationship holds: $\Delta E = 2Ex - Bx$. With this relationship, the difference between a photon confined in the optical resonator 5 and Bx/2 and the difference between Bx/2 and the resonance energy of an exciton at an angle of incidence of 0° become equal. With this relationship, furthermore, the difference between Bx/2 and the upper-branch resonator polariton and the difference between Bx/2 and the lower-branch resonator polariton become equal.

Beams of excitation light with which the optical resonator 5 thus designed is irradiated are set as follows. First, the beams of excitation light are set at a wavelength corresponding to an energy of Bx/2. Further, the beams of excitation light are set at an angle of incidence that takes on the value of that angle of incidence of the lower-branch resonator polariton which corresponds to an energy of Bx/2. In the example shown in FIG. 5, the beams of excitation light are set at angles of incidence of ±26°, respectively. When the optical resonator 5 is irradiated with such beams of excitation light, the beams of excitation light are first in a state of an excitonic molecule and then re-split into an upper-branch resonator polariton and a lower-branch resonator polariton. At this point, as shown in FIG. 5, the correlated photon in the upper-branch resonator polariton and the correlated photon in the lower-branch resonator polariton are different in photon energy from each other but are both emitted at an angle of emission of 0°. That is, the momentum represented by the horizontal axis and the energy represented by the vertical axis are conserved between the beams of excitation light incident on the optical resonator 5 and the correlated photons emitted from the optical resonator 5, whereby the phase matching conditions are satisfied.

Examples of parameters for designing the optical resonator 5 as described above include: the material for the excitonic active medium 14; the material for the first and second reflecting mirrors 11 and 12; the thickness of the thin film constituting the excitonic active medium 14; the thickness of the optical resonator (distance between the outer surface of the first reflecting mirror 11 and the outer surface of the second reflecting mirror 12); the material for the spacer layer 13; the position of the excitonic active medium 14 in the optical resonator 5; the number of layers in cases where the excitonic active medium 14 is a multilayer structure; the shape and size of the excitonic active medium 14 in cases where the excitonic active medium 14 is a structure other than a thin-film structure; etc. By designing these parameters appropriately, the degree of detuning and the binding energy of an excitonic molecule can be made equal.

According to the foregoing configuration, the difference in angle between the traveling direction of excitation light and the traveling direction of a correlated photon can be made wider than ever before. Specifically, although the difference in angle is approximately 26° in the example above, the difference in angle can vary approximately from 15° to 30° according to the design of the optical resonator 5. This makes it possible to easily achieve separation between a photon of excitation light and a correlated photon and separation between two correlated photons.

Further, according to the foregoing configuration, the difference between the energy of a photon of excitation light and the energy of a correlated photon can be made comparatively great. This makes it possible to achieve separation between a photon of excitation light and a correlated photon through a simple component such as a wavelength-selecting filter without using a component such as a spectrometer.

In the example above, two photons of excitation light of equal wavelength are made incident upon the optical resonator 5 from different directions, and two correlated photons of different wavelengths are emitted from the optical resonator 5 in the same direction. However, the opposite of this situation may also be true. That is, two photons of excitation light of different wavelengths may be made incident upon the optical resonator 5, and two correlated photons of equal wavelength may be emitted from the optical resonator 5 in different directions.

In the latter configuration, too, the phase matching conditions can also be satisfied, as long as the optical resonator 5 is designed as described above. That is, by defining the energy of the upper-branch resonator polariton at an angle of incidence of 0° as the energy of one of the photons of excitation light and the energy of the lower-branch resonator polariton as the energy of the other photon of excitation light in FIG. 5, the correlated photons can be emitted at angles of emission of ±26°, respectively. This brings about an effect of making the difference in angle between the traveling direction of excitation light and a correlated photon wider than ever before and an effect of making the difference between the energy of a photon of excitation light and the energy of a correlated photon comparatively great, as with the above configuration.

Figure 6:
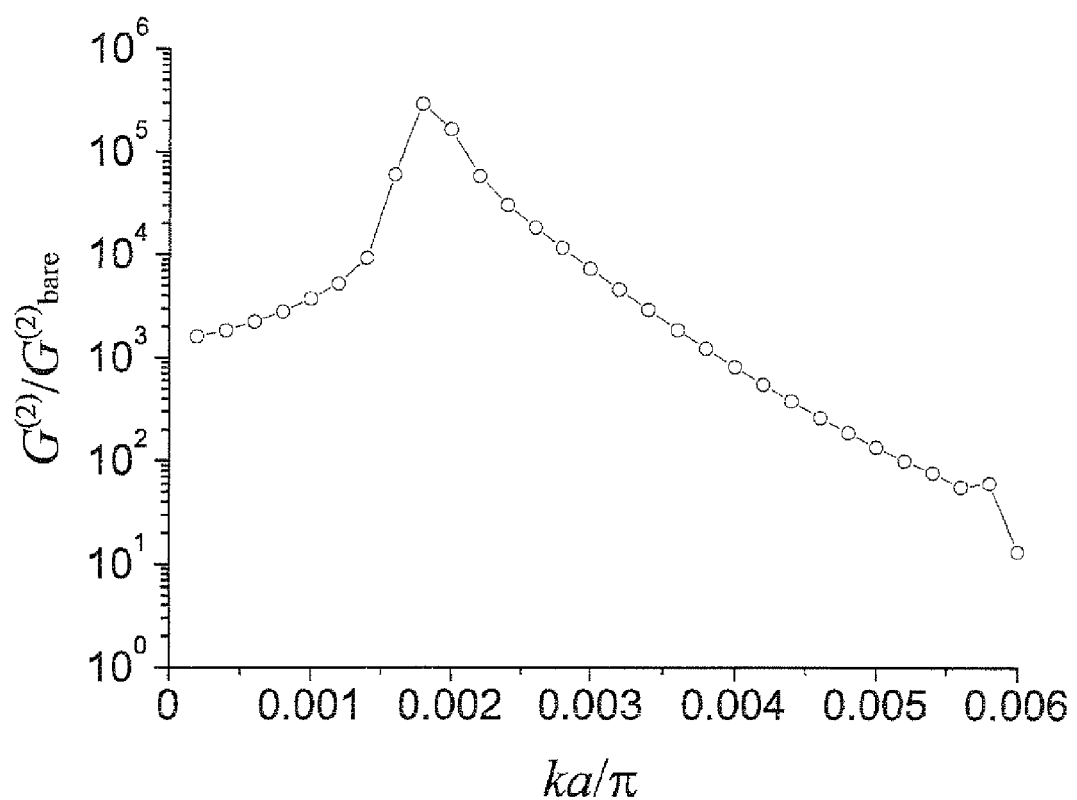
FIG. 6

FIG. 6 is a graph showing a result of calculation of generation efficiency of correlated photons according to the theory of resonator QED (quantum electrodynamics), as obtained when the optical resonator 5 is structured so that the degree of detuning and the binding energy of an excitonic molecule are equal and excitation light is made incident upon the optical resonator 5 so that the phase matching conditions are satisfied. In FIG. 6, the horizontal axis represents a parameter ka/π corresponding to the angle of incidence of excitation light, and the vertical axis represents the standardization of the generation efficiency $G^{(2)}$ of correlated photons with use of a resonator by the generation efficiency $G^{(2)}_{bare}$ of correlated photons without use of a resonator. The preconditions for the result of calculation of generation efficiency as shown in FIG. 6 are as follows: conditions for the optical resonator system (amount of Rabi splitting=50 meV, Q value=100); and conditions for incident light (pulse width=130 fs, intensity≈$10^9$ photon/pulse/cm$^{-2}$).

In cases where as shown in FIG. 6 the angle of incidence of excitation light takes on the value of that angle of incidence of the lower-branch resonator polariton which corresponds to an energy of Bx/2, the generation efficiency is very high or, specifically, more than $10^5$ times as high as compared to that in the absence of a resonator structure.

It should be noted that an example of a parameter of a resonator polariton is an amount of Rabi splitting. The term "amount of Rabi splitting" here means the strength of bond between an exciton and a photon contained in an optical resonator. The amount of Rabi splitting varies depending on the above parameters for designing the optical resonator 5. It is preferable that the amount of Rabi splitting be greater than the binding energy of an excitonic molecule. If the amount of Rabi splitting is too small, there will be a significant decrease in efficiency of generation of a pair of photons. Further, it is necessary that the angle of incidence of excitation light correspond to the amount of Rabi splitting. Meanwhile, the angle of incidence of excitation light depends on the configuration of the photon pair generating apparatus 2 (e.g., N.A. of an incident light-shaping lens 21 to be described later). That is, an upper limit to the amount of Rabi splitting that can be dealt with is determined by the configuration of the photon pair generating apparatus 2 in which excitation light is made incident upon the optical resonator 5.

(Specific Example Configurations of the Photon Pair Generating Apparatus)

Figure 7:
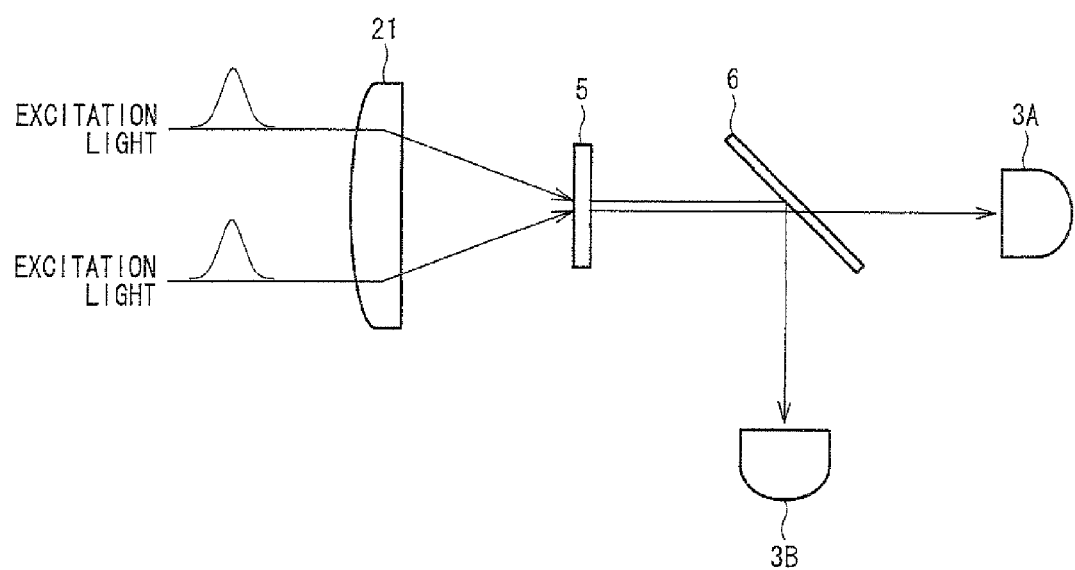
FIG. 7

Next, specific example configurations of the photon pair generating apparatus 2 are described. FIG. 7 shows specific examples of a configuration of a part in which beams of excitation light are made incident upon the optical resonator 5 and of a configuration in which two correlated photons are separated from each other. In the example shown in FIG. 7, two beams of excitation light emitted from the light source 4 and traveling in parallel with each other are refracted by the incident light-shaping lens 21, which is a subcomponent of the light-shaping section 7, so as to be incident upon the optical resonator 5. That is, by utilizing the converging effect of the incident light-shaping lens 21, a configuration is achieved in which the optical resonator 5 is irradiated with two beams of light from different directions. Further, the two beams of light are made incident in parallel with and symmetrically about the optical axis of the incident light-shaping lens 21, and the optical axis of the incident light-shaping lens 21 is in alignment with a direction normal to the surface of incidence of the optical resonator 5. This allows the two beams of light to be incident upon the optical resonator axisymmetrically about the direction normal to the surface of incidence of the optical resonator 5.

It should be noted that two beams of exciting light that travel in parallel with each other can be generated, for example, by such a subcomponent of the light-shaping section 7 as follows. First, a beam of light emitted from a light source is split into two beams of light by a beam splitter. After that, a mirror is appropriately placed to reflect the two beams of light so that the two beams of light are uniform in optical path and travel in parallel with each other.

As described above, the configuration in which the optical resonator 5 is irradiated with two beams of light of equal wavelength from different directions can be achieved by a very simple configuration.

Further, the light-separating section 6 is constituted by either a dichroic beam splitter that sorts two photons according to wavelength or a combination of a 50% beam splitter and a wavelength-selecting filter. Two correlated photons that are emitted from the optical resonator 5 are filtered by being separated from each other by the beam splitter, with the result that they are accurately detected by the first and second photon detectors 3A and 3B, respectively. It should be noted here that because two correlated photons that are emitted from the optical resonator 5 travel in the same direction, the positions of the first and second photon detectors 3A and 3B can be easily set.

Figure 8:
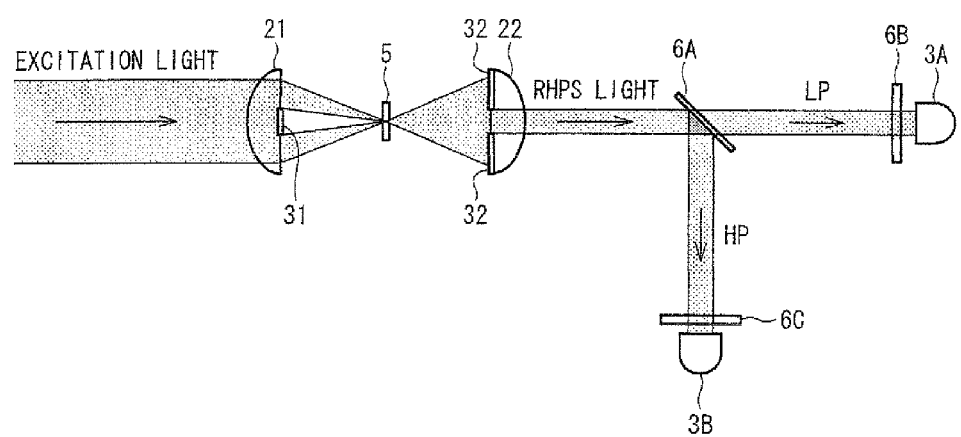
FIG. 8

In a configuration shown in FIG. 8, the incident light-shaping lens 21 is irradiated with excitation light (laser beam) having a predetermined light region, and the excitation light is split into two beams of light by placing a mask 31 as a subcomponent of the light-shaping section 7 in the light region of the excitation light, so that the two beams of light are incident upon the optical resonator 5. In the example shown in FIG. 8, the mask 31 is provided on the light-emitting surface of the incident light-shaping lens 21. It should be noted that the position in which the mask 31 is placed is not limited to this position. The mask 31 may be provided on the light-incident surface of the incident light-shaping lens 21, in a region between the incident light-shaping lens 21 and the optical resonator 5, or in a space where light is incident upon the incident light-shaping lens 21, etc.

According to such a configuration, one beam of light that is emitted from the light source 4 can be converted into two beams of light by the mask 31, which is an incredibly simple component. Further, by combining the mask 31 with the incident light-shaping lens 21, a configuration is achieved in which the optical resonator 5 is irradiated with two beams of light from different directions.

Further, in the configuration shown in FIG. 8, there is provided an emitted light-shaping lens 22 for shaping emitted light emitted from the optical resonator 5. This emitted light-shaping lens 22 allows diffused light emitted from the optical resonator 5 to be converted into parallel light so that a beam splitter 6A serving as the light-separating section 6 is irradiated with the parallel light.

Further, there is provided an aperture in a region where among the emitted light emitted from the optical resonator 5, RHPS light serving as a beam of light of correlated photons travels, and there is provided an emission-side mask 32 for blocking light from other regions. In the example shown in FIG. 8, the emission-side mask 32 is provided on the light-incident surface of the emitted light-shaping lens 22. It should be noted that the position in which the emission-side mask 32 is placed is not limited to this position. The emission-side mask 32 may be provided on the light-emitting surface of the emitted light-shaping lens 22, in a region between the emitted light-shaping lens 22 and the optical resonator 5, or in a space where light is emitted from the emitted light-shaping lens 22, etc.

According to the photon pair generating apparatus 2 of the present embodiment, as described above, the difference in angle between the traveling direction of excitation light and the traveling direction of a correlated photon can be made wider than ever before. This makes it possible to easily separate excitation light and a correlated photon from each other using such a simple component as the emission-side mask 32.

Further, in the example shown in FIG. 8, the light-separating section 6 is constituted by the beam splitter 6A and wavelength-selecting filters 6B and 6C. Two correlated photons that are emitted from the optical resonator 5 are separated from each other into two directions by the beam splitter. Then, the wavelength-selecting filter 6B, which is provided facing that side of the first photon detector 3A upon which light is incident, and the wavelength-selecting filter 6C, which is provided facing that side of the second photon detector 3B upon which light is incident, allow the two correlated photons to be accurately detected by the first and second photon detectors 3A and 3B, respectively.

Figure 9:
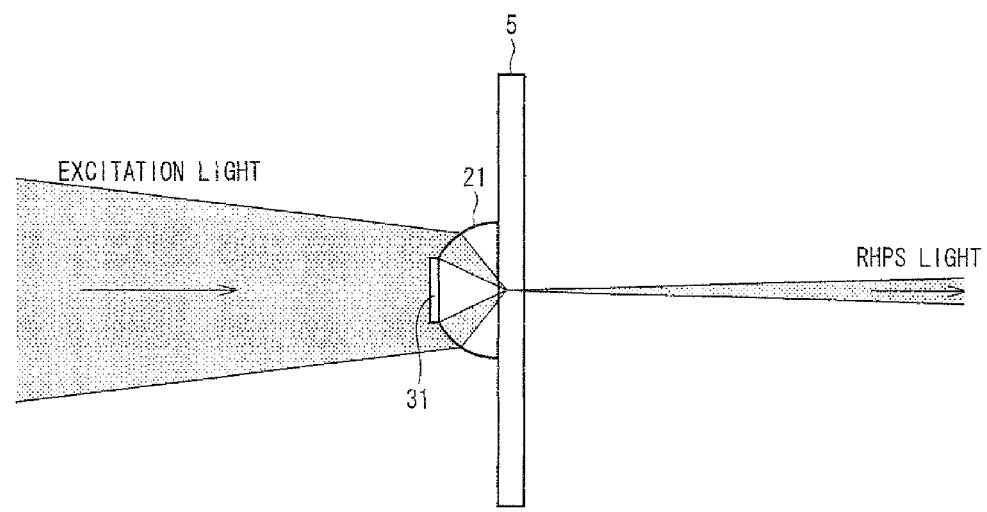
FIG. 9

In a configuration shown in FIG. 9, the incident light-shaping lens 21 used is a solid immersion (SI) lens. As shown in FIG. 9, the SI lens is a hemisphere or Weierstrass-sphere lens that is used with its light-emitting surface in close contact with the light-incident surface of the optical resonator 5. Such a configuration makes it possible to attain a much higher N.A. (numerical aperture) than a normal lens. Further, the mask 31 is provided on the light-incident surface of the incident light-shaping lens 21, whereby one beam of light that is emitted from the light source 4 is converted into two beams of light.

That is, by using the incident light-shaping lens 21, which is a solid immersion lens, and the mask 31, two beams of excitation light can be made incident upon the optical resonator at a wider angle. Further, this configuration can also increase the intensity of excitation light per unit volume (excitation density) and therefore can cause RHPS more efficiently at the same intensity of excitation light. Furthermore, the wider angle of incidence of excitation light makes it possible to more easily achieve separation between RHPS light that is emitted in a perpendicular direction (pair of correlated photons) and excitation light.

Further, because the angle of incidence of excitation light can be made wider to some extent, the phase matching conditions for incident light can be satisfied at the same time within a certain range. Consequently, even if an optical resonator 5 fabricated is somewhat different in structure from that designed, it is not necessary to externally adjust the angle of incidence of excitation light, as long as the conditioned angle falls within this range. This means that the conditions for fabrication accuracy of an optical resonator 5 are lightened. Therefore, the permissible scope of design errors during actual apparatus fabrication can be broadened. Accordingly, a reduction in fabrication cost is expected.

The present invention is not limited to the description of the embodiments above, but may be altered by a skilled person within the scope of the claims. An embodiment based on a proper combination of technical means disclosed in different embodiments is encompassed in the technical scope of the present invention.

Industrial Applicability

A photon pair generating system according to the present invention can be applied to quantum information and communications technology, such as quantum cryptographic technology using quantum teleportation, by using a pair of correlated photon pairs that is generated.

Reference Signs List

1 Photon pair generating system
    2 Photon pair generating apparatus
    3A, 3B First and second photon detectors
    4 Light source
    5 Optical resonator
    6 Light-separating section
    6A Beam splitter
    6B, 6C Wavelength-selecting filter
    7 Light-shaping section
    11, 12 First and second reflecting mirrors
    13 Spacer layer
    14 Excitonic active medium (correlated-photon-pair generating member)
    21 Incident light-shaping lens
    22 Emitted light-shaping lens
    31 Mask
    32 Emission-side mask

The invention claimed is:

1. A photon pair generating apparatus comprising:
a light source for emitting light;
a light-shaping section for shaping a beam of light emitted from the light source;
a correlated-photon-pair generating member for taking in two photons from a beam of light emitted from the light-shaping section, for generating an excitonic molecule by resonantly exciting the two photons, and for, through collapse of the excitonic molecule, releasing two correlated photons quantum-correlated with each other as a pair of correlated photons,
the light-shaping section irradiating the correlated-photon-pair generating member with two beams of light of equal wavelength from different directions,
the correlated-photon-pair generating member being configured to emit two correlated photons of different wavelengths in one direction as the pair of correlated photons.

2. The photon pair generating apparatus as set forth in claim 1, further comprising an optical resonator for taking in light emitted from the light source, and for increasing an intensity of the light by internally resonating the light, wherein
the correlated-photon-pair generating member is located internally in the optical resonator.

3. A photon pair generating apparatus comprising:
a light source for emitting light;
a light-shaping section for shaping a beam of light emitted from the light source;
an optical resonator for taking in light emitted from the light source, and for increasing an intensity of the light by internally resonating the light,
the optical resonator including a correlated-photon-pair generating member for generating an excitonic molecule by resonantly exciting two photons taken therein, and for, through collapse of the excitonic molecule, releasing two correlated photons quantum-correlated with each other as a pair of correlated photons, the optical resonator being set so that a degree of detuning and a binding energy of the excitonic molecule are equal, the degree of detuning representing a difference between a resonance energy of an exciton and a resonance energy of a photon confined in the resonator,
the light-shaping section irradiating the optical resonator with light so that phase matching conditions are satisfied between two photons incident upon the optical resonator and two correlated photons being emitted from the optical resonator.

4. The photon pair generating apparatus as set forth in claim 3, wherein:
   the light-shaping section irradiates the correlated-photon-pair generating member with two beams of light of equal wavelength from different directions; and
   the optical resonator is configured to emit two correlated photons of different wavelengths in one direction as the pair of correlated photons.

5. The photon pair generating apparatus as set forth in claim 2 or 3, wherein the optical resonator is configured so that an amount of Rabi splitting in the optical resonator is greater than a binding energy of the excitonic molecule.

6. The photon pair generating apparatus as set forth in claim 1 or 3, wherein the correlated-photon-pair generating member is a quantum well, a quantum wire, or a quantum dot.

7. The photon pair generating apparatus as set forth in claim 1 or 3, wherein:
   the light-shaping section includes an incident light-shaping lens and a mask;
   the incident light-shaping lens is irradiated with a beam of light emitted from the light source and having a predetermined light region; and
   the beam of light is split into two beams of light by placing the mask in the light region of the beam of light, so that the correlated-photon-pair generating member is irradiated with the two beams of light from different directions.

8. The photon pair generating apparatus as set forth in claim 1 or 4, wherein:
   the light-shaping section irradiates the correlated-photon-pair generating member with two beams of light of equal wavelength from different directions axisymmetrical about a direction normal to a light-incident surface of the correlated-photon-pair generating member; and
   the correlated-photon-pair generating member is configured to emit two correlated photons of different wavelengths as the pair of correlated photons in a direction normal to a light-emitting surface of the correlated-photon-pair generating member.

9. A photon pair generating method comprising the steps of:
   (i) using a light-shaping section to shape a beam of light emitted from a light source for emitting light; and
   (ii) using a correlated-photon-pair generating member to take in two photons from a beam of light emitted from the light-shaping section, to generate an excitonic molecule by resonantly exciting the two photons, and to, through collapse of the excitonic molecule, release two correlated photons quantum-correlated with each other as a pair of correlated photons,
   the light-shaping section irradiating the correlated-photon-pair generating member with two beams of light of equal wavelength from different directions,
   the correlated-photon-pair generating member being configured to emit two correlated photons of different wavelengths in one direction as the pair of correlated photons.

10. A photon pair generating method comprising the steps of:
   (i) using a light-shaping section to shape a beam of light emitted from a light source for emitting light; and
   (ii) using an optical resonator to take in light emitted from the light source, and to increase an intensity of the light by internally resonating the light,
   the optical resonator including a correlated-photon-pair generating member for generating an excitonic molecule by resonantly exciting two photons taken therein, and for, through collapse of the excitonic molecule, releasing two correlated photons quantum-correlated with each other as a pair of correlated photons, the optical resonator being set so that a degree of detuning and a binding energy of the excitonic molecule are equal, the degree of detuning representing a difference between a resonance energy of an exciton and a resonance energy of a photon confined in the resonator,
   the light-shaping section irradiating the optical resonator with light so that phase matching conditions are satisfied between two photons incident upon the optical resonator and two correlated photons being emitted from the optical resonator.

* * * * *